(12) United States Patent
Rebholz-Goldmann et al.

(10) Patent No.: US 11,447,111 B2
(45) Date of Patent: Sep. 20, 2022

(54) BRAKE-MOTOR CONTROL UNIT, BRAKING SYSTEM FOR A VEHICLE HAVING AN ELECTRIC BRAKE MOTOR, AND METHOD FOR THE CONTROL OF THE BRAKE-MOTOR CONTROL UNIT

(71) Applicant: Robert Bosch GmbH, Stuttgart (DE)

(72) Inventors: Peter Rebholz-Goldmann, Kanagawa (JP); Steffen Zechmeister, Bad Wimpfen (DE); Toni Frenzel, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 119 days.

(21) Appl. No.: 16/481,972

(22) PCT Filed: Jan. 17, 2018

(86) PCT No.: PCT/EP2018/051092
§ 371 (c)(1),
(2) Date: Jul. 30, 2019

(87) PCT Pub. No.: WO2018/145869
PCT Pub. Date: Aug. 16, 2018

(65) Prior Publication Data
US 2020/0039488 A1    Feb. 6, 2020

(30) Foreign Application Priority Data
Feb. 8, 2017    (DE) ..................... 10 2017 201 982.4

(51) Int. Cl.
*B60T 13/74*    (2006.01)
*B60T 8/18*    (2006.01)
(Continued)

(52) U.S. Cl.
CPC ............ *B60T 8/1881* (2013.01); *B60T 7/045* (2013.01); *B60T 7/12* (2013.01); *B60T 8/1755* (2013.01); *B60T 15/041* (2013.01)

(58) Field of Classification Search
CPC .......... B60T 7/045; B60T 7/12; B60T 8/1755; B60T 8/1881; B60T 13/741; B60T 15/041; B60T 2270/402
See application file for complete search history.

(56) References Cited

U.S. PATENT DOCUMENTS 6,030,054 A * 2/2000 Doericht ................. B60T 7/042
188/162
7,748,793 B2 * 7/2010 Hartmann ............... B60T 17/22
303/122.02
(Continued)

FOREIGN PATENT DOCUMENTS

DE    10 2008 033 309 A1    4/2009
DE    10 2013 007 857 A1    11/2014
(Continued)

OTHER PUBLICATIONS

International Search Report corresponding to PCT Application No. PCT/EP2018/051092, dated Apr. 12, 2018 German and English language document) (8 pages).

*Primary Examiner* — Thomas W Irvin
(74) *Attorney, Agent, or Firm* — Maginot, Moore & Beck LLP

(57) ABSTRACT

A brake motor control device for control of an electric brake motor of an electromechanical braking device includes a connection unit configured to be connected to an auxiliary control unit for controlling the electric brake motor in an event of a fault of the brake motor control device. The electric brake motor is configured to displace a brake piston against a brake disc.

19 Claims, 3 Drawing Sheets

(51) Int. Cl.
  *B60T 7/04*   (2006.01)
  *B60T 7/12*   (2006.01)
  *B60T 8/1755*  (2006.01)
  *B60T 15/04*  (2006.01)

(56) References Cited

U.S. PATENT DOCUMENTS

| | | | | |
|---|---|---|---|---|
| 7,837,278 B2* | 11/2010 | Nilsson | ................... | B60T 8/321 |
| | | | | 303/20 |
| 8,645,039 B2* | 2/2014 | Schneider | ............. | B60T 13/588 |
| | | | | 701/70 |
| 10,207,693 B2* | 2/2019 | Baehrle-Miller | ......... | B60T 7/12 |
| 10,220,822 B2* | 3/2019 | Linhoff | ................ | B60T 13/686 |
| 10,246,070 B2* | 4/2019 | Baehrle-Miller | ..... | B60T 13/741 |
| 10,532,724 B2* | 1/2020 | Rebholz-Goldmann | ..................... | |
| | | | | B60T 17/221 |
| 10,710,562 B2* | 7/2020 | Masuda | ................... | B60T 8/00 |
| 10,773,698 B2* | 9/2020 | Ayichew | ................ | B60T 8/885 |
| 2004/0201270 A1* | 10/2004 | Suzuki | ................ | B60T 13/741 |
| | | | | 303/20 |
| 2005/0127749 A1* | 6/2005 | Hartmann | ............. | F16D 65/568 |
| | | | | 303/122 |
| 2008/0021623 A1* | 1/2008 | Frey | ........................ | B60T 8/321 |
| | | | | 701/70 |
| 2008/0296106 A1* | 12/2008 | Nilsson | ................... | B60T 8/885 |
| | | | | 188/156 |
| 2010/0204894 A1* | 8/2010 | Strengert | ............. | B60T 17/221 |
| | | | | 701/70 |
| 2011/0144878 A1* | 6/2011 | Schneider | ............ | B60T 13/588 |
| | | | | 701/70 |
| 2011/0202246 A1* | 8/2011 | Lindsay | ................. | B60T 1/005 |
| | | | | 701/70 |
| 2011/0278108 A1* | 11/2011 | Watanabe | ............... | F16D 65/18 |
| | | | | 188/72.3 |
| 2011/0320099 A1* | 12/2011 | Kim | ....................... | B60T 8/885 |
| | | | | 701/70 |
| 2013/0261917 A1* | 10/2013 | Kotake | ................. | F16D 65/183 |
| | | | | 701/70 |
| 2013/0282249 A1* | 10/2013 | Heise | .................... | B60T 13/588 |
| | | | | 701/70 |
| 2015/0251639 A1* | 9/2015 | Sautter | ................... | B60T 8/174 |
| | | | | 701/70 |
| 2016/0339885 A1* | 11/2016 | Linhoff | .................. | B60T 17/18 |
| 2018/0079398 A1* | 3/2018 | Baehrle-Miller | ..... | B60T 13/588 |
| 2018/0079399 A1* | 3/2018 | Baehrle-Miller | ....... | B60T 8/171 |
| 2018/0236876 A1* | 8/2018 | Isono | ........................ | B60L 7/26 |
| 2018/0345938 A1* | 12/2018 | Rebholz-Goldmann | ..................... | |
| | | | | B60T 13/741 |
| 2018/0345947 A1* | 12/2018 | Rebholz-Goldmann | ..................... | |
| | | | | B60T 13/748 |
| 2019/0084543 A1* | 3/2019 | Bai | ...................... | F16D 65/183 |
| 2019/0092297 A1* | 3/2019 | Ayichew | ................ | B60T 8/885 |
| 2019/0270440 A1* | 9/2019 | Baehrle-Miller | ....... | B60T 17/22 |
| 2020/0216052 A1* | 7/2020 | Campau | ................. | B60T 13/586 |
| 2020/0331442 A1* | 10/2020 | Ch | .......................... | B60T 8/885 |
| 2020/0369246 A1* | 11/2020 | Brand | .................... | B60T 13/62 |
| 2021/0009095 A1* | 1/2021 | Kim | ....................... | B60T 8/1881 |
| 2021/0009102 A1* | 1/2021 | Nakayama | .............. | B60R 16/03 |
| 2021/0155215 A1* | 5/2021 | Ganzel | ................... | B60T 8/326 |

FOREIGN PATENT DOCUMENTS

| | | |
|---|---|---|
| DE | 10 2015 200 928 A1 | 7/2016 |
| EP | 1 418 103 A1 | 5/2004 |
| EP | 1 964 741 A2 | 9/2008 |
| JP | 2004-161046 A | 6/2004 |
| JP | 2013-203275 A | 10/2013 |
| WO | 00/068053 A1 | 11/2000 |
| WO | 2007/009826 A1 | 1/2007 |

* cited by examiner

BRAKE-MOTOR CONTROL UNIT, BRAKING SYSTEM FOR A VEHICLE HAVING AN ELECTRIC BRAKE MOTOR, AND METHOD FOR THE CONTROL OF THE BRAKE-MOTOR CONTROL UNIT

This application is a 35 U.S.C. § 371 National Stage Application of PCT/EP2018/051092, filed on Jan. 17, 2018, which claims the benefit of priority to Serial No. DE 10 2017 201 982.4, filed on Feb. 8, 2017 in Germany, the disclosures of which are incorporated herein by reference in their entirety.

The disclosure relates to a brake motor control device and to a braking system for a vehicle with an electromechanical braking device having a braking unit with an electric brake motor.

BACKGROUND

DE 10 2008 033 309 A1 describes a parking brake system with two electromechanical actuators, for the actuation of which a braking force is generated when the vehicle is at a standstill. In addition to the wheel control units assigned to the actuators, the parking brake system comprises another control unit that detects the driver's demand. Since each actuator is assigned a wheel control unit, even in the event of a failure of a wheel control unit the wheel control unit that is still intact can perform its function and can generate a parking brake force by means of the assigned actuator.

A braking system for a motor vehicle with a service brake and an electric parking brake is known from DE 10 2015 200 928 A1. The service brake and the parking brake are each assigned to a control unit, wherein the control unit of the service brake is a control unit of an electronic stability program.

SUMMARY

The brake motor control device according to the disclosure can be used to control an electric brake motor in vehicles that is part of an electromechanical braking device in a braking system for the vehicle. The electromechanical braking device is used in particular as a parking or holding brake for setting the vehicle at a standstill.

The electric brake motor is advantageously integrated into a wheel brake device and displaces a brake piston against a brake disc. The wheel braking device is preferably the wheel braking device of the hydraulic vehicle brake in the vehicle, so that the brake piston in the wheel braking device can be displaced towards the brake disc depending on both the hydraulic brake fluid of the hydraulic vehicle brake and on the electric brake motor at the same time or offset in time and mutually independently.

In a preferred embodiment, the electromechanical braking device comprises an electric brake motor on the two wheel braking devices on the left and right on the rear axle of the vehicle. A common brake motor control device is preferably assigned to the two electric brake motors.

The brake motor control device generates control signals for controlling the associated electric brake motor. Depending on the control, the electric brake motor is actuated to press the brake piston against the brake disc and generate an electromechanical braking force, or is displaced in the opposite direction in the releasing direction in order to reduce the clamping braking force and to displace the brake piston towards a starting position in which no electromechanical braking force is acting.

The brake motor control device is also equipped with a connection unit that enables connection to an auxiliary control unit which, in the event of a fault of the brake motor control device, in particular a microcontroller of the brake motor control device or a standard driver unit, takes over control of the electric brake motor. The auxiliary control unit thus ensures that an electromechanical braking force can be generated by means of the electric brake motor even if the brake motor control device fails in whole or in part. The connection unit in the brake motor control device enables a redundant design of the control of the electric brake motor.

In particular, a control unit of an additional braking device or brake unit of the braking system is considered as an auxiliary control unit, for example the control unit for an actuator of the hydraulic vehicle brake. The auxiliary control unit performs the control of the actuator in the hydraulic vehicle brake in its main function and the control of the electric brake motor in the event of a fault in the brake motor control device in its additional function.

According to an advantageous embodiment, the brake motor control device is an ESP control unit (electronic stability program) with which a hydraulic pump of the ESP system and valves in the hydraulic vehicle brake are actuated in the main function. The ESP control unit performs the control of the electric brake motor as an additional function. This additional function can be performed in the ESP control unit in the event of a fault via the connection unit and the additional control unit that is docked to the connection unit.

If a plurality of electric brake motors are present in the braking system, these can each advantageously be controlled via a connection unit in the ESP control unit, wherein the same auxiliary control unit is preferably connected to each connection unit. If necessary, it is also possible that only one connection unit is provided for the connection of the auxiliary control unit and both brake motors are controlled via said one connection unit.

According to a further advantageous embodiment, a microcontroller of the brake motor control device, which is assigned to the electric brake motor, is connected to the connection unit via an enabling line. In the event of a fault, the connection unit in the brake motor control device to which the auxiliary control unit is connected is enabled by enabling the line. Enabling shall be carried out either in the event that a standard driver unit of the electric brake motor is no longer available or in the event that the system availability of the brake motor control device has been degraded to unavailability. In this case, the control of the electric brake motor can be taken over by means of the enabled connection unit and the auxiliary control unit.

The connection unit advantageously includes a backup driver unit and a logic unit with the control logic. If necessary, the connection unit may still comprise a current measuring unit for determining the motor current and/or a detection unit for detecting the switching state of an actuation switch, by means of which the electromechanical braking device can be manually controlled by the driver.

In the event of a detected fault in the brake motor control device, in particular in the microcontroller of the brake motor control device or in the standard driver unit, the backup driver unit is activated and controlled by signals from the auxiliary control unit. The logic unit with the control logic in the connection unit for the electric brake motor can be controlled by means of the backup driver unit. The control of the electric brake motor is intended to be carried out, where appropriate, by analyzing the motor current of the electric brake motor determined in the current measuring unit in the connection unit.

The connection unit of the brake motor control device advantageously comprises an interface for connecting the auxiliary control unit. The interface is either implemented as a plug connection and/or as a network connection, for example a LIN bus. Signals of the auxiliary control unit are read into the brake motor control device via the interface, in particular signals for the control direction of the brake motor (clamping direction or releasing direction) and an actuation signal with which control of the brake motor is triggered.

According to a further advantageous embodiment, the connection unit is connected via one or more switches or connection units, which are disposed between the standard driver unit and the power electronics of the brake motor. The connection is made via an actuation path with a plurality of connecting lines, each of which is used to control the left and right brake motors. The power electronics of the brake motor include H-bridges for controlling the electric brake motors, for example.

The braking system according to the disclosure for a vehicle comprises an electromechanical braking device with one or more wheel braking devices, which are provided with an electric brake motor that displaces a brake piston against a brake disc. The braking system includes the brake motor control device described above for controlling the electric brake motor, wherein the brake motor control device is equipped with a connection unit for the connection of an auxiliary control unit. Accordingly, in the event of a fault of the brake motor control device, the control of the electric brake motor or the electric brake motors can be taken over by the auxiliary control unit in the event of a fault.

The braking system advantageously comprises a total of two electric brake motors, in particular in the wheel braking devices on the left and right rear wheels of the vehicle, wherein the electromechanical braking device can be used as a holding or parking brake. The two electric brake motors are preferably controlled by a common brake motor control device. The function of the auxiliary control unit is advantageously taken over by a control unit that controls an actuator of the hydraulic vehicle brake in the vehicle, for example an electric brake booster, as the main function thereof.

BRIEF DESCRIPTION OF THE DRAWINGS

Further advantages and advantageous embodiments can be found in the further claims, the description of the figures and the drawings. In the figures:

DETAILED DESCRIPTION

Figure 1:
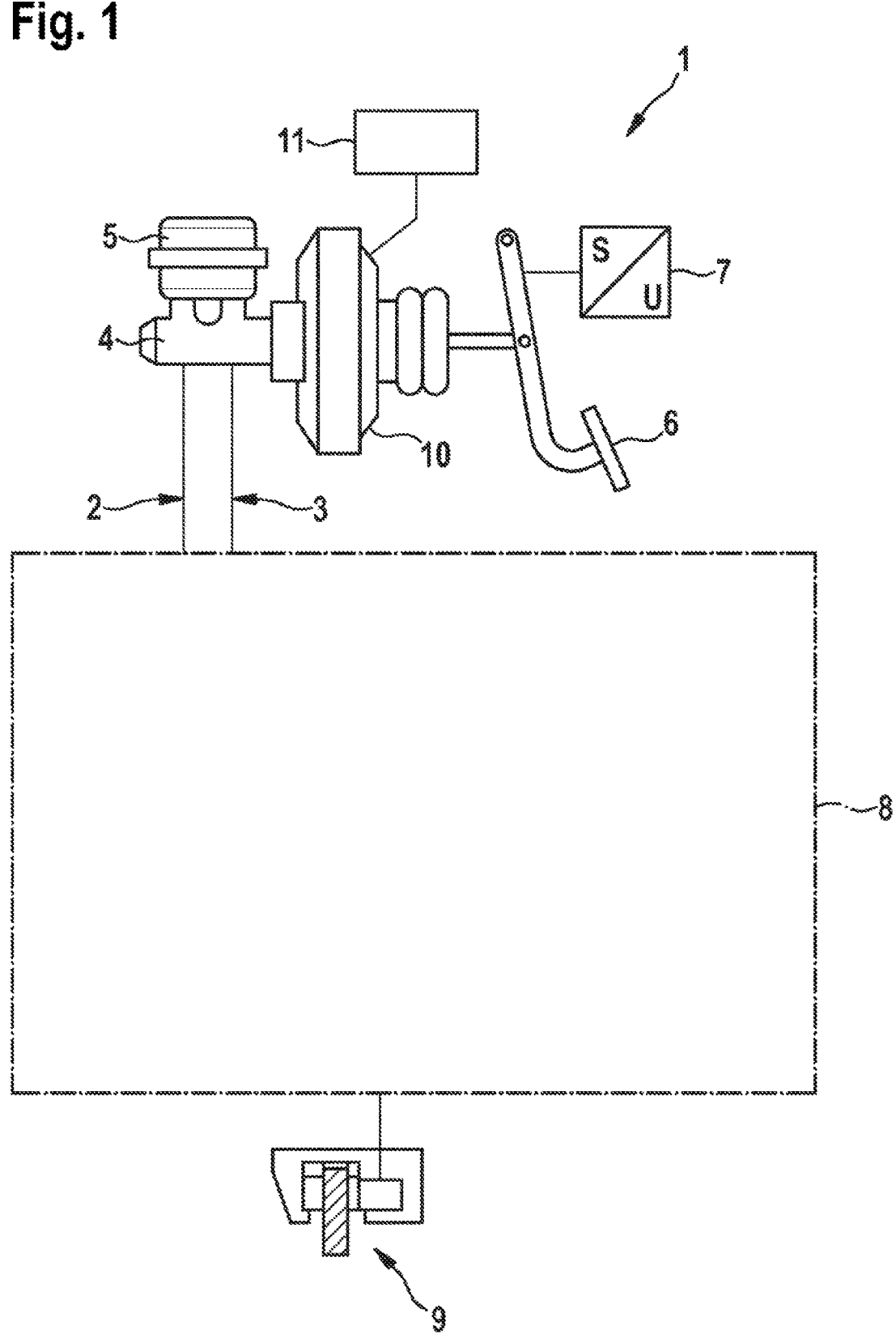
FIG. 1 shows a schematic representation of a hydraulic vehicle brake with a brake booster, wherein the wheel braking devices of the vehicle brakes on the vehicle rear axle are additionally equipped with an electromechanical braking device with an electric brake motor.

In the figures, the same components are provided with the same reference characters.

The hydraulic vehicle brake 1 shown in FIG. 1 for a vehicle comprises a front axle brake circuit 2 and a rear axle brake circuit 3 for the supply and control of wheel braking devices 9 on each wheel of the vehicle with a brake fluid under hydraulic pressure. Said brake circuits may also be embodied as two diagonal brake circuits, each with a front wheel and a diagonally disposed rear wheel.

The two brake circuits 2, 3 are connected to a common master brake cylinder 4, which is supplied with brake fluid by means of a brake fluid storage tank 5. The main brake cylinder piston inside the master brake cylinder 4 is operated by the driver by means of the brake pedal 6, wherein the pedal travel exerted by the driver is measured by a pedal travel sensor 7. Between the brake pedal 6 and the master brake cylinder 4 there is an electric brake booster 10, which includes, for example, an electric motor, which preferably operates the master brake cylinder 4 via a gearbox (iBooster). The brake booster 10 is an active brake component for influencing the hydraulic brake pressure.

The control movement of the brake pedal 6 measured by the pedal travel sensor 7 is transmitted as a sensor signal to a control unit 11 of the braking system, in which control signals are generated for the control of the brake booster 10. The wheel braking devices 9 are supplied with brake fluid in each brake circuit 2, 3 via different switching valves, which together with other units are part of brake hydraulics 8. The brake hydraulics 8 also include a hydraulic pump, which is part of an electronic stability program (ESP). The hydraulic pump is also an active brake component for influencing the hydraulic braking pressure. The adjustable components of the electronic stability program—valves and the hydraulic pump—are controlled by an ESP control unit 24 (FIGS. 2, 3).

Figure 2:
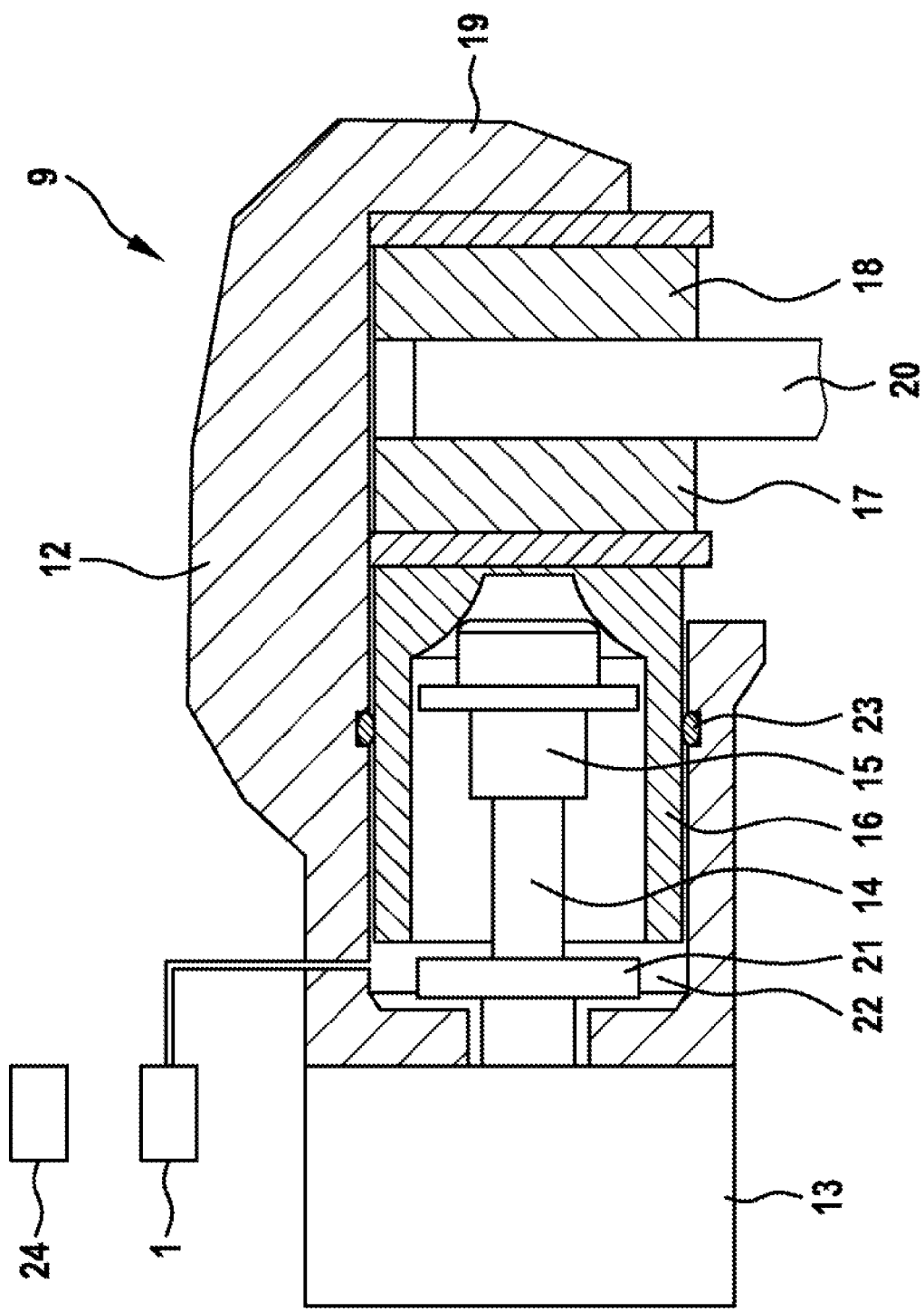
FIG. 2 shows a section through an electromechanical brake device with an electric brake motor.
Figure 3:
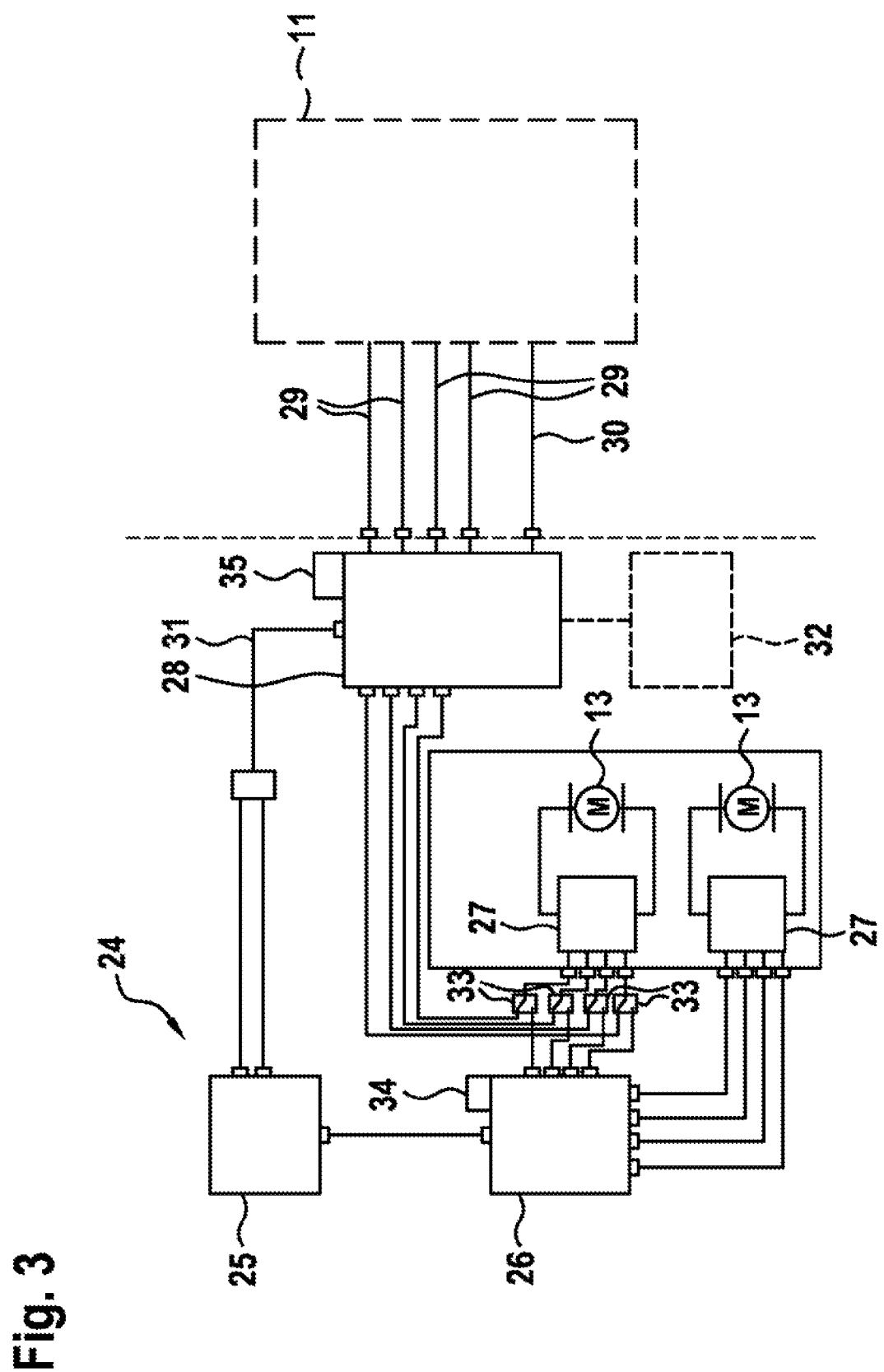
FIG. 3 shows an ESP control unit that also controls the electromechanical braking device and comprises an interface for an auxiliary control unit.

In FIG. 2 the wheel braking device 9, which is disposed on a wheel on the rear axle of the vehicle, is shown in detail. The wheel braking device 9 is part of the hydraulic brake 1 and is supplied with brake fluid 22 from the rear axle brake circuit. The wheel braking device 9 also comprises an electromechanical braking device, which is preferably used as a parking brake for setting a vehicle at standstill, but also for braking the vehicle when the vehicle is moving, in particular in the case of lower vehicle speeds below a speed limit.

The electromechanical brake device comprises a brake caliper 12 with a claw 19 that engages over a brake disc 20. As a control element, the brake device comprises a motor-gearbox unit with a direct current electric motor as a brake motor 13, the rotor shaft of which drives a spindle 14 rotationally, on which a spindle nut 15 is rotationally fixedly supported. When the spindle 14 is rotated, the spindle nut is displaced 15 axially. The spindle nut 15 moves within a brake piston 16 that carries a brake pad 17 that is pressed by the brake piston 16 against the brake disc 20. On the opposite side of the brake disc 20 there is another brake pad 18 that is held stationary on the claw 19. The brake piston 16 is sealed pressure-tight relative to the accommodating housing on the outside of the brake piston 16 by an enclosing sealing ring 23.

Within the brake piston 16, the spindle nut 15 during a movement of the spindle 14 can move axially forwards towards the brake disc 20 or during an opposite rotational movement of the spindle 14 can move axially to the rear until reaching a final stop 21. To generate a clamping force, the spindle nut 15 acts on the inner end face of the brake piston 16, whereby the brake piston 16 that is axially movably supported in the braking device is pressed with the brake pad 17 against the facing end face of the brake disc 20. The spindle nut 15 is a transmission element between the brake motor and the brake piston.

For the hydraulic braking force, the hydraulic pressure of the brake fluid 22 from the hydraulic vehicle brake 1 acts on the brake piston 16. The hydraulic pressure may also be acting when the electromechanical braking device is operated when the vehicle is at a standstill, so that the total braking force is composed of the electromotive component and the hydraulic component. While the vehicle is travelling, either only the hydraulic brake is active or both the hydraulic brake and the electromechanical braking device are active or only the electromechanical braking device is active for generating braking force. The control signals for controlling both the adjustable components of the hydraulic vehicle brake 1 and the electromechanical wheel brake device 9 are generated in the ESP control unit 24.

In FIG. 3 the ESP control unit 24 is shown, which in addition to controlling the components of the electronic stability program also controls the electric brake motors 13 of the electromechanical braking device. The ESP control unit 24 comprises a microcontroller 25, which is connected to a standard driver unit 26 for the actuation of the two electric brake motors 13 on the wheel braking units on the left and right rear wheels of the vehicle. The standard driver unit 26 acts on the H-bridges 27 as electronic components for controlling the electric brake motors 13.

The control unit 24 is provided with a connection unit 28, which is an interface for connecting an auxiliary control unit 11, with which the control of one or both electric brake motors 13 is carried out in the event of a fault in the ESP control unit 24. The auxiliary control unit 11 is in particular the control unit 11 for the electric brake booster 10 (FIG. 1). The connection of the auxiliary control unit 11 to the connection unit 28 is carried out either via plug connections 29 and/or via a network connection 30.

The connection unit 28 communicates with the microcontroller 25 via an enabling line 31. This allows the microcontroller 25 to enable the connection unit 28 and a backup driver unit contained therein in the event of a fault. In addition to the backup driver unit, the connection unit 28 includes a logic unit for creating control signals. Furthermore, the connection unit 28 may be provided with a current measuring unit for determining the brake motor current and a detection unit 32 or may communicate with the detection unit 32, with which the switching state of an actuation switch is detected, by means of which the electromechanical braking device can be manually controlled by the driver.

The connection unit 28 is connected to switches or connection units 33 disposed between the standard driver unit 26 and the H-bridges 27 of a brake motor 13. The connection units 33 make it possible to decouple the H-bridges 27 and the associated brake motor 13 from the standard driver unit 26 in the event of a fault and instead to couple the connection unit 28 and to allow the H-bridges 27 and the associated brake motor 13 to be controlled by the control unit 11.

The standard driver unit 26 and the connection unit 28 can be equipped with a charge pump circuit 34, 35 to operate the H-bridges 27 at the required voltage levels.

The invention claimed is:

1. A brake motor control device for control of an electric brake motor of an electromechanical braking device associated with the brake motor control device, the brake motor control device comprising:
an auxiliary control unit configured to control said electric brake motor in an event of a fault of the associated brake motor control device;
a connection unit configured to connect said auxiliary control unit to the electric brake motor only in the event of the fault; and
a microcontroller connected via an enabling line to the connection unit, the microcontroller configured to enable the connection unit to connect said auxiliary control unit to the electric brake motor,
wherein the electric brake motor is configured to displace a brake piston against a brake disc.

2. The brake motor control device as claimed in claim 1, wherein the brake motor control device is an Electronic Stability Program (ESP) control unit.

3. The brake motor control device as claimed in claim 1, wherein the connection unit includes a current measuring unit.

4. The brake motor control device as claimed in claim 1, wherein the connection unit includes a detection unit configured to detect a switching state of an actuating switch, in order to control the electromechanical braking device.

5. The brake motor control device as claimed in claim 1, wherein the connection unit is connected via one or more connection units that are disposed between a standard driver unit and power electronics of the electric brake motor.

6. A braking system for a vehicle with an electromechanical braking device, comprising:
a wheel braking device including an electric brake motor configured to displace a brake piston against a brake disc; and
a brake motor control device associated with and configured to control said electric brake motor, the brake motor control device including;
an auxiliary control unit configured to control the electric brake motor in an event of a fault of the associated brake motor control device;
a connection unit configured to connect said auxiliary control unit to the electric brake motor only in the event of the fault; and
a microcontroller connected via an enabling line to the connection unit, the microcontroller configured to enable the connection unit to connect said auxiliary control unit to the electric brake motor.

7. The braking system as claimed in claim 6, wherein the auxiliary control unit is assigned to an additional braking device or brake unit of the braking system and the auxiliary control unit is further configured to undertake control of the electric brake motor as a supplementary function in the event of the fault of the brake motor control device.

8. The braking system as claimed in claim 7, wherein the auxiliary control unit is configured to control an actuator of a hydraulic vehicle brake as a main function.

9. The braking system as claimed in claim 8, wherein the auxiliary control unit is further configured to control an electric brake booster of the hydraulic vehicle brake as the main function.

10. The braking system as claimed in claim 6, wherein the electromechanical braking device further comprises:
two braking units, each including an electric brake motor; and
a common brake motor control device,
wherein the auxiliary control unit is configured to control the electric brake motor in the event of the fault of the brake motor control device and is connected via the connection unit in the brake motor control device.

11. The braking system as claimed in claim 6, wherein the auxiliary control unit is connected via plug connections to the connection unit of the brake motor control device.

12. The braking system as claimed in claim 6, wherein the auxiliary control unit is connected via a network connection to the connection unit of the brake motor control device.

13. A method for controlling a brake motor control device comprising:

operating a brake motor control device to control an electric brake motor of an electromechanical braking device associated with the brake motor control device;

operating a microcontroller connected via an enabling line to a connection unit of the brake motor control device to enable the connection unit to connect to an auxiliary control unit only in an event of a fault of the associated brake motor control device; and operating the auxiliary control unit to take over control of the electric brake motor of the electromechanical braking device in the event of the fault of the associated brake motor control device, wherein the fault includes a fault in a microcontroller of the brake motor control device or a standard driver unit, and wherein the electric brake motor is configured to displace a brake piston against a brake disc.

14. The method as claimed in claim 13, further comprising:

determining a brake motor current in a current measuring unit of the connection unit.

15. The method as claimed in claim 13, further comprising:

detecting, using a detection unit communicating with the connection unit, a switching state of an actuating switch, wherein the switching state is configured to enable an electromechanical braking device to be manually controlled by a driver.

16. The brake motor control device as claimed in claim 1, wherein the electromechanical braking device is a parking brake or holding brake in a braking system for a vehicle.

17. The braking system as claimed in claim 6, wherein the electromechanical braking device is a parking brake or holding brake in a braking system for a vehicle.

18. A braking system for a vehicle with an electromechanical braking device, comprising:

a wheel braking device including an electric brake motor configured to displace a brake piston against a brake disc; and a brake motor control device associated with and configured to control said electric brake motor, the brake motor control device including a connection unit connected to an auxiliary control unit configured to control the electric brake motor in an event of a fault of the associated brake motor control device, wherein the auxiliary control unit is assigned to an additional braking device or brake unit of the braking system and the auxiliary control unit is further configured to undertake control of the electric brake motor as a supplementary function in the event of the fault of the brake motor control device, and wherein the auxiliary control unit is configured to control an actuator of a hydraulic vehicle brake as a main function.

19. The braking system as claimed in claim 18, wherein the auxiliary control unit is further configured to control an electric brake booster of the hydraulic vehicle brake as the main function.

\* \* \* \* \*